US005781394A

United States Patent [19]

Lorenz et al.

[11] Patent Number: 5,781,394

[45] Date of Patent: Jul. 14, 1998

[54] SURGE SUPPRESSING DEVICE

[75] Inventors: Ronald N. Lorenz; Frederick Parker, both of San Diego, Calif.

[73] Assignee: Fiskars Inc., Madison, Wis.

[21] Appl. No.: 813,981

[22] Filed: Mar. 10, 1997

[51] Int. Cl.$^6$ .................... H02H 1/00

[52] U.S. Cl. .................... 361/124; 361/121; 361/126; 361/111; 338/21; 337/41; 337/142

[58] Field of Search .................... 361/117–119, 121, 361/124, 126, 111; 338/20, 21, 215; 337/4, 142, 153, 182, 183

[56] References Cited

U.S. PATENT DOCUMENTS

| | | | |
|---|---|---|---|
| 425,061 | 4/1890 | Bishop | 337/31 |
| 2,619,518 | 11/1952 | Kelsay | 361/129 |
| 2,896,128 | 7/1959 | Fuller et al. | 361/119 |
| 3,254,181 | 5/1966 | Lemieux | 337/18 |
| 3,569,819 | 3/1971 | Martzloff et al. | 363/58 |
| 3,600,664 | 8/1971 | Goldberg et al. | 323/263 |
| 3,863,111 | 1/1975 | Martzloff | 361/119 |
| 3,896,343 | 7/1975 | Baker et al. | 361/120 |
| 4,103,274 | 7/1978 | Burgess et al. | 338/21 |
| 4,212,045 | 7/1980 | Martzloff | 361/127 |
| 4,249,224 | 2/1981 | Baumbach | 361/124 |
| 4,288,833 | 9/1981 | Howell | 361/124 |
| 4,401,912 | 8/1983 | Martzloff et al. | 313/17 |
| 4,467,245 | 8/1984 | Bloomer et al. | 315/75 |
| 4,493,005 | 1/1985 | Lange | 361/124 |
| 4,527,215 | 7/1985 | Wessing | 361/124 |
| 4,630,163 | 12/1986 | Cooper et al. | 361/56 |
| 4,851,946 | 7/1989 | Igarashi et al. | 361/124 |
| 5,172,295 | 12/1992 | Hegner et al. | 361/117 |
| 5,210,677 | 5/1993 | Smith | 361/119 |
| 5,224,008 | 6/1993 | Popat et al. | 361/56 |
| 5,313,183 | 5/1994 | Kasahara | 337/32 |
| 5,596,475 | 1/1997 | Figueiredo et al. | 361/119 |

*Primary Examiner*—Jeffrey A. Gaffin
*Assistant Examiner*—Michael J. Sherry
*Attorney, Agent, or Firm*—Foley & Lardner

[57] ABSTRACT

A surge suppressing device includes a voltage-dependent resistor having an opening formed therethrough. A pair of preformed pads formed of an electrically conductive material is located adjacent a first and second side respectively of the voltage-dependent resistor proximate the opening. The electrically conductive material flows through the opening creating an electrical short between the first and second sides when the voltage-dependent resistor is heated in response to excessive leakage current flowing therethrough.

28 Claims, 2 Drawing Sheets

SURGE SUPPRESSING DEVICE

FIELD OF THE INVENTION

This invention relates to an electrical transient surge suppressing device, and more particularly to a surge suppressing device such as a Metal Oxide Varistor (MOV) including a short circuiting mechanism.

BACKGROUND OF THE INVENTION

Surge protection devices are used to protect sensitive electronic equipment such as personal computers from exposure to electric power surges. A voltage-dependent resistor which varies in resistance when exposed to a voltage greater than a predetermined level is commonly used in surge protection devices. One such voltage-dependent resistor is a Metal Oxide Varistor (MOV).

The MOV is used to clamp voltage transients to a level that can be tolerated by the electronic equipment. At normal operating voltages of the equipment the MOV presents a high impedance, thereby drawing insignificant leakage current. When an electrical power surge occurs, the MOV impedance will remain high until the surge voltage exceeds the MOV breakdown voltage at which time the impedance of the MOV will abruptly drop. This has the effect of clamping the surge voltage at the MOV breakdown voltage and diverting the excess surge energy through the MOV, thereby protecting the electronic equipment with which the MOV is associated. When the voltage returns below the MOV's breakdown voltage, the MOV will return to its high impedance state.

While MOV are typically very effective in clamping transient surge voltages, it has been found that if the electrical transients are of sufficient magnitude or time duration, the MOV may fail because of over stress due to excess current or power dissipation. As a result, the MOV will lose its ability to present a high impedance below the breakdown voltage, and it will typically fail to a low resistance state of the order of ten ohms. In that event, a relatively significant amount of power will continue to be dissipated by the MOV even when the applied voltage across the MOV has recovered to normal conditions after the electrical surge has ceased. This condition may cause a significant rise in temperature of the MOV, which if going undetected can create a potential fire and safety hazard.

To eliminate this hazard prior art systems commonly use a fuse or other current sensitive device in series with the MOV. The fuse is designed to open under a continuous current condition, as is the case when the MOV has failed, thus preventing continuous power dissipation by the MOV. The series current fuse must, however, be large enough to allow the current associated with voltage transients to pass through the fuse and be absorbed by the MOV.

However, in instances when the MOV has failed in a sufficiently high impedance state, not enough current will flow through the series current fuse to cause the fuse to open. In other cases, a wiring fault in the circuit of the fuse may also prevent the fuse from opening. In any of such conditions the failed MOV will continue to dissipate significant amounts of power causing a severe rise in the temperature of the MOV which may create a fire and/or safety hazard.

While lower current rated fuses would naturally cause an open circuit in the event the MOV has failed, they also tend to be a nuisance because of failures during normal voltage transients. A more reliable approach consists of using a thermal fuse (also called thermal cut-off) or a positive temperature coefficient thermistor (PTC) which is placed either in physical proximity with the MOV or which is thermally connected to the MOV such that the thermal fuse or PTC will sense the MOV temperature. The thermal fuse or PTC is also placed electrically in series with the MOV and the applied electrical power. Accordingly, when the MOV reaches a sufficiently high temperature, the thermal fuse will open or the PTC will go to a high resistance thus limiting the power in the MOV and keeping the temperature rise of the MOV to an acceptable level to reduce the chance of a fire or safety hazard.

Although using a thermal fuse or PTC typically minimizes the hazardous conditions caused by the failure of the MOV, the mechanical placement of parts both at design and manufacturing is made more difficult. Also additional parts and processes are required for this thermal fuse approach over the series current fuse approach above. Furthermore, during repair or maintenance operation, the relative placement of the MOV and thermal fuse/PCT may be disturbed, thus reducing and perhaps totally impairing the effectiveness of this approach.

From the foregoing it is apparent that the limitations of prior art transient surge suppressing devices utilizing MOV's have not been entirely satisfactorily addressed. It is therefore desirable to provide a transient surge suppressing device that overcomes the limitations described above.

SUMMARY OF THE PRESENT INVENTION

An electrical transient surge suppressing device in accordance with one aspect of the present invention comprises a voltage-dependent resistor having oppositely facing sides and an opening formed therethrough. An electrically conductive material having a predetermined melting point is electrically connectable with at least one of the sides of the resistor proximate the opening. The electrically conductive material flows through the opening creating an electrical short between the sides when the temperature of the device reaches a certain level in response to excessive leakage current flowing therethrough.

In accordance with another aspect of the invention the voltage-dependent resistor is a metal oxide varistor. In still another aspect of the invention the electrically conductive material is formed as a pair of pads or pellets, one of the pads being connected to the first side and the other of the pads being connected to the second side of the resistor. In yet another aspect of the invention the device includes a coating substantially encapsulating the electrically conductive material to contain it in its molten state.

Other principal features and advantages of the invention will become apparent to those skilled in the art upon review of the following drawings, the detailed description and the appended claims.

BRIEF DESCRIPTION OF THE DRAWINGS

The invention will hereafter be described with reference to the accompanying drawings, wherein like reference numerals denote like elements and.

DETAILED DESCRIPTION OF A PREFERRED EMBODIMENT

Figure 1:
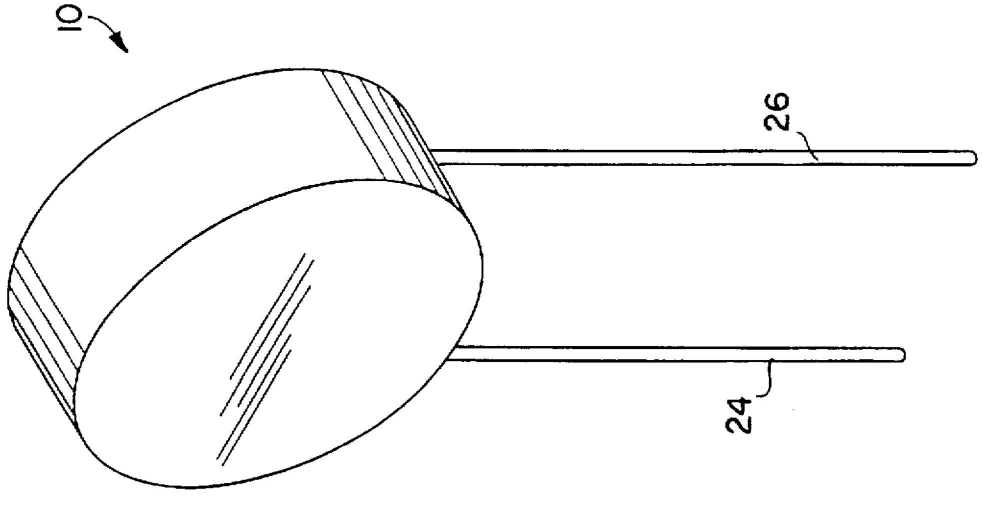
FIG. 1 is an isometric view of the surge suppressing device of the present invention.

Referring to FIGS. 1–4, a detailed description of an exemplary surge suppressing device 10 will be described. Device 10 includes a voltage dependent resistor 12 having an opening 14 formed therethrough. Although opening 14 is depicted in the drawings as having a particular configuration, those skilled in the art will appreciate that opening 14 could have other shapes or sizes without departing from the scope of the present invention.

Resistor 12 includes an electrically conductive first side 16 and an opposing electrically conductive second side 18. Typically, sides 16 and 18 are rendered electrically conductive by metal plating (generally represented as 19) over most of the area of sides 16, 18, except the periphery of device 10 to prevent arcing between sides 16 and 18. In the illustrated embodiment, sides 16 and 18 are substantially planar and are separated by a thickness. Opening 14 includes a first end 20 proximate the first side 16, and a second end 22 proximate the second side 18 within the planes of sides 16 and 18, the opening 14 defines predetermined areas. Similarly, regions of sides 16, 18 adjacent ends 20, 22, will not be plated to prevent arcing. Device 10 also commonly includes a pair of leads 24, 26, each of which being mechanically and electrically connected to resistor 12. Specifically, portions 24*a*, 26*a* of leads 24, 26 are electrically connected to electrically conductive first and second sides 16, 18 respectively of resistor 12.

The device further includes a pair of electrically conductive pads 28 adjacent first and second sides 16, 18, respectively, located proximate opening 14, and electrically connected to sides 16, 18. However, the principles of the present invention may also be carried out with the use of a single pad 28 adjacent one side of the resistor 12. A coating material 30 encapsulates resistor 12, pads 28, and a portion 24*a*, 26*a* of leads 24, 26.

In the preferred embodiment resistor 12 is a Metal Oxide Varistor (MOV). MOV 12 is electrically connected to respective points of an electrical circuit (not shown) via the first and second leads 24, 26. While the preferred embodiment has been represented with two leads, one side of the MOV (i.e., one of the two electrodes) may be connected directly to the electrical circuit dispensing of the need to use a lead.

MOV 12 presents a predetermined high impedance level when a normal operating voltage is applied to leads 24, 26, that is during normal operation of the associated electrical circuit. When an electrical power surge, which exceeds the MOV rated breakdown voltage, is applied to MOV 12, the impedance of the MOV will abruptly change to a low level. Once the power surge is no longer present, MOV 12 returns to its steady state high impedance level. For example, MOV 12 may present a predetermined high level impedance of 200,000 Ohms for voltage levels below a breakdown voltage level of 200 Volts D.C. In this instance, the resistance may drop down to less than one Ohm when a voltage above the MOV breakdown voltage level is present across the MOV. However, those skilled in the art will readily recognize that the present invention is not dependent upon the particular MOV rating.

Figure 2:
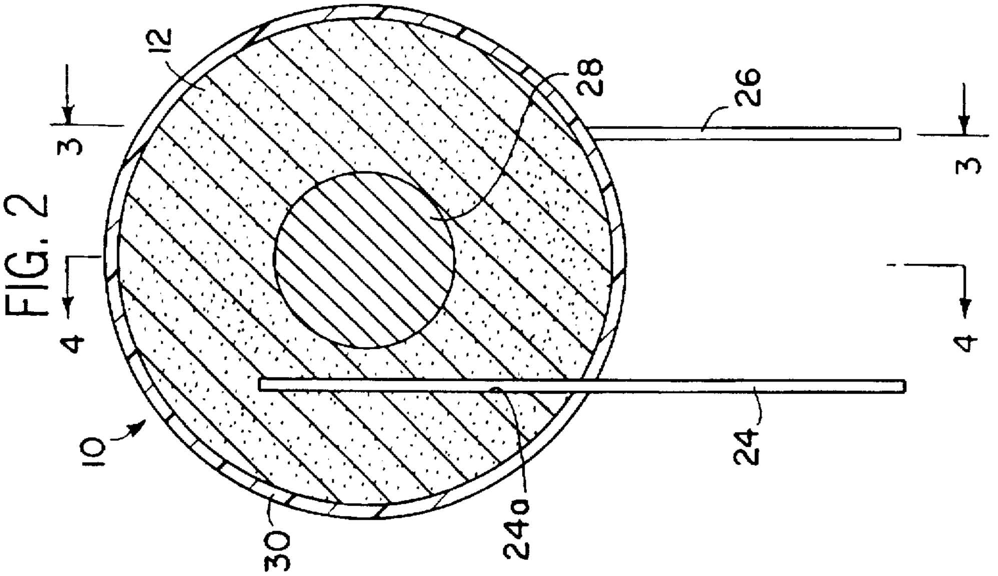
FIG. 2 is a sectional view thereof.
Figure 3:
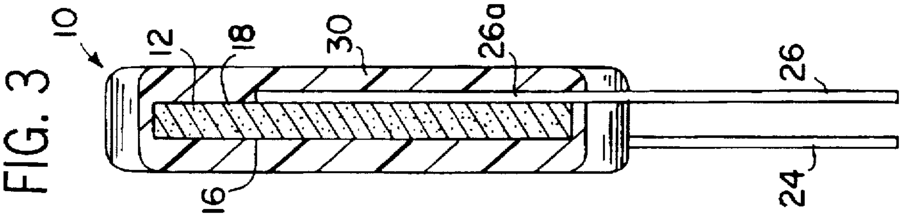
FIG. 3 is a sectional view of the surge suppressing device taken along line 3—3 of FIG. 2.
Figure 4:
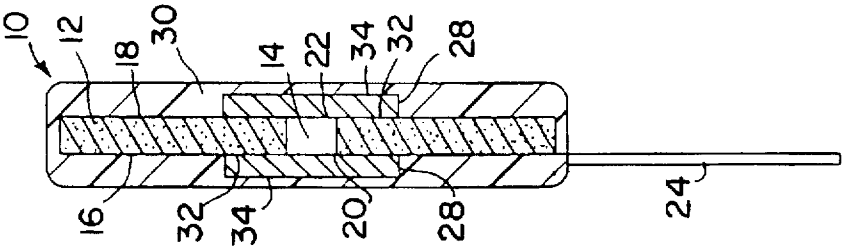
FIG. 4 is a sectional view of the surge suppressing device taken along line 4—4 of FIG. 2.

Electrically conductive pads 28 (or pellets) are formed of a flowable material which remains in the solid state below a specific melting temperature. In the preferred embodiment pads 28 are formed of solder and have a melting point substantially lower than the conductive material forming metal plating 19. However, other electrically conductive and flowable materials may be utilized. Further, as illustrated in FIGS. 2–4, pads 28 are formed in the shape of discs having a predetermined radius and thickness in a plane parallel to the sides 16, 18, the pads 28 have portions in all directions which are laterally displaced from the areas of the opening 20. Of course other configurations can also be used.

Figure 5:
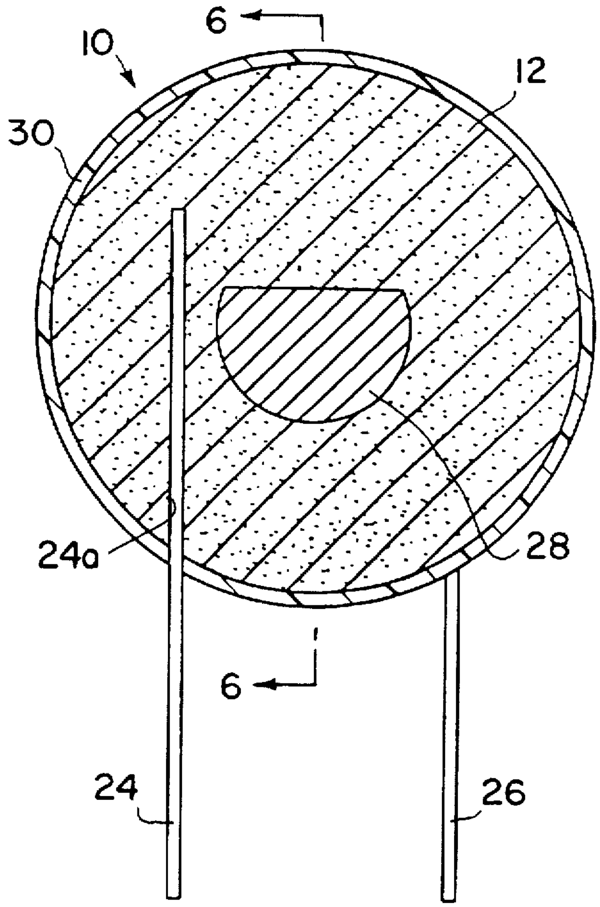
FIG. 5 is a sectional view of the surge suppressing device in the shorted mode.
Figure 6:
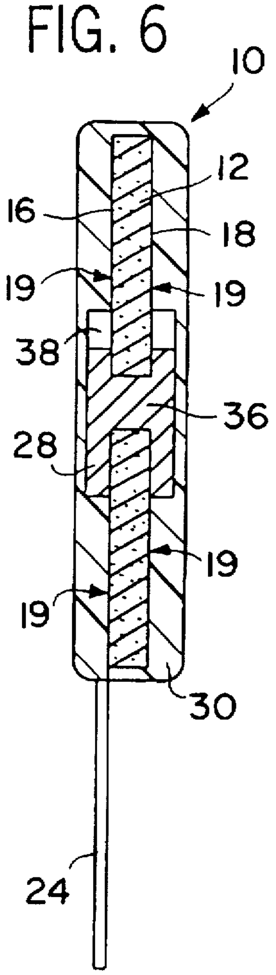
FIG. 6 is a section view of the surge suppressing device in the shorted mode taken along line 6—6 of FIG. 5.

Each pad 28 includes a first side 32 and a second opposing side 34. First side 32 of each pad 28 is positioned over ends of opening 20, 22 respectively. In the preferred embodiment each pad 28 is positioned about each hole end 20, 22 such that there is a substantially equal amount of material about the circumference of each opening end 20, 22. Additionally, as illustrated in FIGS. 5 and 6 and explained below, each pad 28 includes a sufficient amount of material to form an electrical short 36 through opening 14.

As illustrated best in FIG. 4, coating material 30 encapsulates pads 28 relative to sides 16, 18 of MOV 12. The volume of pads 28 together with opening 14 constitute a cavity 38, which confines pads 28 both in their solid as well as liquid or flowable states. In the preferred embodiment material 30 is a thermosetting resin such as epoxy. However other materials may be used to effectively contains the electrically conductive material within cavity 38 in its liquid state.

As discussed above, in the normal operating mode of device 10, MOV 12 is used to clamp voltage transients to a level that can be tolerated by the electrical equipment. However, when the electrical transients are of sufficient magnitude or time duration, MOV 12 can fail. In the failed mode the impedance of MOV 12 will typically be sufficient to cause a current flowing through MOV 12 to dissipate a significant amount of power. This results in an increase in the temperature of MOV 12.

When the temperature of MOV 12 rises to the melting temperature of pads 28, the electrically conductive material of pads 28 changes from a solid to molten state. Under the force of gravity, conductive material 28 will flow from both sides 16, 18 through end 20, 22 of opening 14 forming a connection therethrough while remaining contained within cavity 38 by coating material 30. As a result, both sides 16, 18 of MOV 12 will be electrically shorted by short 36.

Resulting short 36 diverts current from the MOV thereby reducing the power dissipated in the failed MOV and consequently the temperature of the device. This reduction in temperature causes molten material 28 of short 36 to solidify resulting in a permanent short circuit permanently connecting both sides 16, 18 of failed MOV 12. MOV 12 thus provides a predictable high quality permanent electrical short when the device temperature rises up to or above a predetermined limit for any reason thereby limiting fire and other safety hazards.

When the failed MOV 12 having short 36 is used in a circuit in conjunction with a series current fuse or other current limiting device (not shown), the low impedance of the shorted MOV will result in excess current being drawn through such circuit causing the fuse or other current limiting device to open or go to a high impedance state. This series current fuse further protects against any thermally related safety hazard in the equipment within which the failed MOV is associated.

It is also significant to note that the specific configuration described herein permits device 10 to operate in any orientation relative to a mounting surface to which device 10 is mechanically attached. Provided there is a sufficient quantity of material 28 to fill opening 14, when electrically conductive material 28 is in the molten state, and since initially some of the molten material in pad 28 will be above the bottom of the opening 28, gravity causes material 28 to flow through opening 14. Since coating material 30 contains conductive material 28 in its liquid molten state within cavity 38, material 28 will be directed though opening 14, irrespective of the orientation of device 10.

Pads 28 are preferably situated on both sides 16, 18 of MOV 12 in the region of opening 14 such that there is material extending circumferentially about ends 20, 22. However, pads 28 may also be disposed spaced from opening 14 if a sufficient quantity of conductive material 28 is provided to fill opening 14 in the molten state.

The method for forming a short in a failed electrical transient surge protector will now be described. In the preferred embodiment, opening 14 is formed at the time MOV 12 itself is formed. Since, typically, the materials forming MOV's are pressed into the desired shape and sintered, in this case, a plug of suitable configuration will be positioned in the cavity configured to receive the MOV materials so that opening 14 is formed as part of the sintering step. However, in other cases it may be advantageous to form opening 14 during a subsequent operation.

Sides 16, 18 are then partially or entirely plated with an electrically conductive material 19 to insure appropriate electrical connections with leads 24, 26. Pads 28 are then located adjacent sides 16, 18 of MOV 12 proximate ends 20, 22 respectively of opening 14. Pads 28 are attached to sides 16, 18 to form a complete seal about opening 14 to ensure opening 14 remains clear of foreign matters which may prevent the formation of short 36. Pads 28 may be sealed to sides 16, 18 with an adhesive material or by bonding pads 28 directly to MOV 12 by melting a portion of first side 32 of each pad 28. In addition to preventing foreign matter from entering opening 14, this sealing step also prevents conductive material 28 from entering opening 14.

In the preferred embodiment a thermosetting epoxy is applied to MOV 12, pads 28 and lead portions 24*a*, 26*a* to form sealed cavity 38 about pads 28. In this manner MOV 12 is completely encapsulated. However, it is possible to encapsulate only pads 28 and a limited region of MOV 12 necessary to form cavity 38.

During operation of device 10 short 36 will be formed as a result of an increase in the operating temperature of MOV 12 above the melting temperature of pads 28. In this manner conductive material of pads 28 flows through opening 14 forming short 36. As seen earlier, this will cause the temperature of MOV 12 to drop causing molten material 28 to solidify and form a permanent short 36.

Although the invention has been described in conjunction with specific embodiments thereof, it is evident that many alternatives, modifications and variations will be apparent to those skilled in the art. For example, voltage dependent resistor 12 could be configured and constructed in ways other than those described. Conductive material 28 and opening 14 could also take other forms provided there is enough of material 28 to create short 36. Conductive material 28 could also be placed within opening 14 such that there remains a gap between the material. In this configuration, a short would be created when MOV 12 was heated above the melting temperature of the material. Additionally, as noted above a single pad 28 may be utilized adjacent a single side of MOV 12. Thus, these other configurations, constructions, and modifications may be made in the design and arrangement of elements disclosed herein without departing from the scope of the appended claims. Accordingly, the invention as described and hereinafter claimed is intended to embrace all alternatives, modifications and variations that fall within the spirit and scope of the appended claims.

What is claimed is:

1. An electrical transient surge suppressing device comprising:

a voltage-dependent resistor having a conductive first side, a conductive second side and an opening physically disposed between and communicating the first side with the second side, a voltage-dependent resistive material physically disposed between the first and second sides;

a first lead attached to the first side and a second lead attached to the second side; and an electrically conductive material having a predetermined melting point, the conductive material being electrically connected with at least one of the sides proximate the opening;

wherein the electrically conductive material flows through the opening creating an electrical short between the first side and the second side when the resistor is heated in response to excessive leakage current flowing through the device.

2. The device of claim 1, wherein the voltage-dependent resistor is a metal oxide varistor.

3. The device of claim 1, wherein the electrically conductive material is formed as a pair of pads, one of the pads being connected to the first side and the other of the pads being connected to the second side.

4. The device of claim 1, further including a coating substantially encapsulating the electrically conductive material to contain it in its molten state.

5. The device of claim 4, wherein the coating is a thermosetting resin.

6. The device of claim 5, wherein the thermosetting resin is epoxy.

7. The device of claim 3, wherein each pad is sealed to a respective side of the voltage-dependent resistor about the opening.

8. The device of claim 3, wherein each pad is configured as a disc.

9. The device of claim 1, wherein the electrically conductive material is solder.

10. The device of claim 3, wherein the pads are positioned relative to the opening to permit the material to flow through the opening and form an electrical connection between the first and second sides when the device is in any orientation relative to a mounting surface to which the device is mechanically attached.

11. A self-shorting electrical transient surge protector device comprising:

a voltage-dependent resistor having a conductive first side, an opposing conductive second side and an opening physically disposed between and communicating the first side with the second side, a voltage-dependent resistive material physically disposed between the first side and the second side, the opening having a first end proximate the first side and a second end proximate the second side, the first and second sides being electrically connectable to respective points of an electrical circuit, the resistor operating at a steady state temperature when current flows through the circuit under normal operating conditions;

at least one electrically conductive pellet formed adjacent one of the first side and second side and electrically connected to the one of the first side and second side. the pellet extending about the one of the first end and second end; and a coating encapsulating the pellet against the resistor;

wherein the pellet is made of a flowable conductive material flowing through the opening to create an electrical short between the first and second ends when the resistor temperature rises above the steady state temperature and exceeds a predetermined temperature in response to excessive current flowing through the circuit.

12. The device of claim 11, wherein the at least one pellet is sealed to the end of the opening to prevent the coating from entering therein.

13. The device of claim 11, wherein the voltage-dependent resistor is a metal oxide varistor.

14. The device of claim 11, wherein the pellet is solder.

15. The device of claim 11, wherein the coating is epoxy.

16. The device of claim 11, wherein the coating forms a hermetically sealed cavity to contain the conductive material in its molten state.

17. A method for forming an electrical short circuit in a failed electrical transient surge protector, the surge protector having an operating temperature, the method comprising:

forming an opening in a body of a voltage-dependent resistor extending from a first side of the body to a second side of the body spaced from the first side;

plating substantially the first and second sides of the body with a first electrically conductive metal, while keeping the plated first and second sides electrically insulated from each other;

applying a second electrically conductive material having a melting temperature on at least one side of the voltage-dependent resistor proximate an end of the opening; and forming an encapsulating region defining a cavity configured to contain the conductive material about the voltage-dependent resistor when the conductive material is in its molten state; and preselecting the melting temperature of the second conductive material such that when the operating temperature of the voltage-dependent resistor rises thereabove the second conductive material reaches molten state and flows within the opening to form an electrical short circuit between the first and second sides.

18. The method of claim 17, further comprising the step of sealing the conductive material to the voltage-dependent resistor.

19. The method of claim 18, wherein the conductive material is solder.

20. The method of claim 18, wherein the step of sealing includes partially melting the solder to provide a bond to the voltage-dependent resistor.

21. An electrical transient surge suppressing device comprising:

a voltage-dependent resistor having a conductive first side, a conductive second side and an opening extending from the first side to the second side, voltage-dependent resistive material spacing the first side from the second side;

first and second leads in electrically conductive engagement with the first and second sides, respectively; and at least one pad in electrically conductive engagement with one of the sides and disposed about the opening;

wherein said at least one pad is made of a flowable conductive material having a predetermined melting temperature such that at least a portion of said at least one pad will flow through the opening when the one of the sides reaches a temperature at least equal to the predetermined melting temperature, thereby creating an electrical short between the first and second sides.

22. The device of claim 21, wherein the voltage-dependent resistor is such that excessive leakage current passing through the leads causes the temperature of the at least one of the sides to rise.

23. The device of claim 21 further including a coating defining a cavity configured to contain the electrically conductive material in its molten state.

24. The device of claim 23, wherein the coating is a thermosetting resin.

25. The device of claim 23, wherein the coating extends in regions of the first and second sides proximate the opening.

26. A fault-protected resistor, comprising:

a body of resistive material having a first side, a second side and a thickness separating the first side from the second side, an opening in the body formed through the thickness to communicate the first side to the second side;

a first conductor formed of a first conductive material disposed adjacent the first side of the body at least in the vicinity of the opening;

a second conductor formed of the first conductive material disposed adjacent the second side of the body at least in the vicinity of the opening, the first conductor normally insulatively spaced from the second conductor;

a third conductor formed of a second conductive material having a melting point which is less than a melting point of the first conductive material, the third conductor disposed in communication with the opening and thermally coupled to the body of resistive material, the third conductor being so disposed that excessive current from the first conductor to the second conductor will heat the body of the resistive material and the third conductor, causing the third conductor to flow into the opening to create a short between the first conductor and the second conductor.

27. The fault-protected resistor of claim 26, wherein the opening in the body has a predetermined area taken in a plane including the first side, at least one body of the third conductor having portions adjacent the first side which are laterally displaced from the area of the opening in all directions parallel to the plane, such that at least one portion of said at least one body of the third conductor will be above the opening regardless of the orientation of the resistor with respect to gravity.

28. The fault-protected resistor of claim 27, wherein said at least one body o-f the third conductor is formed in the shape of a disk having an area parallel to the plane of the first side which exceeds the area of the opening.

* * * * *